US005475380A

United States Patent [19]

Shim

[11] Patent Number: 5,475,380
[45] Date of Patent: Dec. 12, 1995

[54] TIME ALARM METHOD OF A RADIO PAGING RECEIVER

[75] Inventor: Jong-Yoon Shim, Suwon, Rep. of Korea

[73] Assignee: SamSung Electronics Co., Ltd., Suwon, Rep. of Korea

[21] Appl. No.: 130,522

[22] Filed: Oct. 1, 1993

[30] Foreign Application Priority Data

Nov. 19, 1992 [KR] Rep. of Korea ............. 21775/1992

[51] Int. Cl.$^6$ ................................... H04Q 1/00
[52] U.S. Cl. .................. 340/825.44; 340/825.22; 368/10; 379/57
[58] Field of Search .............. 340/825.48, 825.44, 340/825.22; 379/56, 57; 368/10, 12, 13, 244

[56] References Cited

U.S. PATENT DOCUMENTS

| | | |
|---|---|---|
| 3,937,004 | 2/1976 | Natori et al. . |
| 4,839,641 | 6/1989 | Mori et al. ............. 340/825.48 |
| 4,872,005 | 10/1989 | DeLuca et al. . |
| 5,105,396 | 4/1992 | Ganter et al. . |
| 5,144,599 | 9/1992 | Blaich et al. . |
| 5,150,954 | 9/1992 | Hoff . |
| 5,177,478 | 1/1993 | Wagai et al. . |

Primary Examiner—Michael Horabik
Attorney, Agent, or Firm—Robert E. Bushnell

[57] ABSTRACT

A communication system using a pager receiving calling data transmitted via radio signals from a paging terminal, with the paging receiver being driven by a processing unit that decodes calling data in received calls and checks whether a first code component is time related data by decoding the calling data. If the first code component is time related data, the corresponding mode of the timed alarm setting is determined by comparing mode data with a second code component of the calling data received subsequent to the first code component. A third code component of the calling data received subsequent to the second component is stored in a storage area corresponding to the mode of the time data established by the second code component. Once the time and date represented by the third code component becomes equal to the current time, a controlling stage generates an alarm driving signal, thereby enabling activation of either, or both, an aural or vibration alarm signal, as well as a visual display.

18 Claims, 6 Drawing Sheets

TIME ALARM METHOD OF A RADIO PAGING RECEIVER

CROSS-REFERENCE TO RELATED APPLICATIONS

This application makes reference to, incorporates the same herein, and claims all benefits incurring under 35 U.S.C. §119 from an application for Time Alarm Method of A Radio Paging Receiver filed in the Korea Industrial Property Office on Nov. 19, 1992 and assigned application Ser. No. 1992/21775.

BACKGROUND OF THE INVENTION

Technical Field

The present invention pertains to radio paging receivers, and more particularly, to a circuit and process enabling a personal radio paging receiver to provide a timed alarm by use of a public telephone line.

Background Art

Generally, a radio paging receiver such as a personal pager, is included in a oneway communication system (i.e., a radio paging system) capable of receiving a call provided by a caller. Currently available radio paging systems have a central paging terminal transmitting Post Office Code Standardization Advisory Group (i.e., POCSAG) coded radio signals to individual radio paging receivers or to groups of radio paging receivers via an antenna. A caller dialing the unique number assigned to a pager, is typically connected via public telephone lines and a central office telephone switching system to the paging terminal. The paging terminal processes the unique number received via the public telephone line from the caller, and transmits as a radio signal, a unique code also assigned to the pager sought by the caller.

The pager detects the transmission of its unique code, and as shown in U.S. Pat. No. 3,742,481 to Douglas W. Nickerson, stores incoming paging calls. Currently available pagers store as a received call, among other items, any message component of the radio signal received. Such received calls are stored in the order in which they are received by the pager and the person wearing the pager can, subsequent to the reception and storage of the call, confirm the reception of the call and read the message component of the call; if the pager has received a large number of calls however, the user will normally read all of the message components of the received calls.

Typically, a pager with a timer has a time function as well as a receiving function of a general call. The time function informs the user without wearing a watch of the hour of the current time as maintained by the pager. Moreover, the user can be alerted by the time function at a scheduled time. For example, when the hour has been set, if the user registers the appointed time, by way of example, for a morning wakeup call, through use of the keys on the pager, an alarm is generated at the registered time. This time function however requires complicated circuit construction. That is, the keys necessary for setting the alarm time, the rooming call or the like should be installed outside the hour, of the body of the pager so as to be accessible for the user to operate, and therefore, one or more peripheral circuits are needed.

Thus conventional radio paging receivers necessarily have complicated circuits due to the time function. Moreover, the cost incurred by the installation of the peripheral circuit for the time function results in an increase in the cost of the radio paging receiver.

Efforts to influence the time function of circuits generally, via radio signals include an Autonomous Radio Timepiece, a wristwatch found in U.S. Pat. No. 5,105,396 by W. Ganter and W. Hodapp, describes automatic activation of a timepiece at predetermined points in time to obtain a time indication decoded from radio information, while the Autonomous Radio-Controlled Timepiece by W. Blaich, et al., U.S. Pat. No. 5,144,599, mentions a clock timekeeping circuit and receiver in a wrist bracelet, controlled in response to radio signals received. Manual switching of the wristwatch is used to shift the hour display (e.g., when compensating for changes in time zone). The Pager Watch System Utilizing Time Slot Communication, by D. G. Hoff, described in U.S. Pat. No. 5,150,954, endeavors to obtain synchronization of the pager's current time by transmitting successive frames of information, with each frame having substantially the same duration and being divided into priority of time slots. Each of the time slots has a time reference point, and selected time slot have an associated time slots number corresponding to the time reference point. Individual pager receivers are periodically activated during corresponding ones of the time slots; the pager receivers can calculate the amount of change needed in its activation interval time reference point in order to coincide with its corresponding time slot.

It has been my observation that none of these efforts accommodate establishment of timed alarm settings via radio paging signals. Early efforts to provide a timed alarm function in a radio paging receiver are represented by Paging Receiver Capable Of Reminding A User Of An Important Message Event, U.S. Pat. No. 4,872,005 by Joan S. DeLuca, et alii. I have noticed that in these efforts, the radio paging receiver was necessarily constructed with a plethora of switches and peripheral circuits to implement these additional functions. Moreover, in order to set the time and date of an alarm in memory, a user must manipulate these switches and a cursor in a sequence prescribed by the mode of operation desired by the user. The state of activation of each of these switches (and the associated peripheral circuits) is critically significant at each conditional step of the several modes; consequently, and recognizing the continued intrinsic desire for compactedness of radio paging receivers, an error in manipulation of the external switches, whether through manual clumsiness or through unfamiliarity with the switch activation scheme, either results in an incorrectly set alarm or necessitates repetition of the manipulation of the switches. Furthermore, the size of the housing for the radio paging receiver is undesirably enlarged to accommodate the necessary switches and peripheral circuits.

SUMMARY OF THE INVENTION

It is therefore, an object of the present invention to provide an improved circuit and process for operating a radio paging receiver.

It is another object to provide a radio paging receiver which overcomes the aforementioned deficiencies in the prior art.

It is yet another object to provide a circuit and a time alarm process in a radio paging receiver that has a time function, without requiring additional time function keys.

It is still another object to provide a circuit and a process enabling timed alarms to be set in a radio paging receiver via radio paging signals.

It is still yet another object to provide a circuit and a process enabling a radio paging receiver to automatically set a timed alarm in response to a radio paging message.

It is a further object to provide a circuit and process enabling a radio paging receiver to set an alarm time without the necessity for a user who is then wearing the paging receiver to manipulate a plurality of switches.

It is a still further object to provide a circuit and process having a capacity to be programmed to generate timed alarm signals, with a minimum of peripheral circuits.

It is also an object to provide a circuit and process enabling a personal radio paging receiver to provide a tinted alarm by use of a public telephone line.

These and other objects may be achieved in accordance with one aspect of the present invention, with a circuit and a process for processing calling data provided in a communication system with a paging terminal, by receiving the calling data called by radio from the paging terminal; checking if a first predetermined code is the time related data decoding the calling data; if the first predetermined code is the time related data, detecting a corresponding mode by comparing a second predetermined code subsequent to the first predetermined code with predefined mode data; storing a third predetermined code subsequent to the second predetermined code in a storage area of the detected corresponding mode; and providing an alarm driving instruction when it is time to send an alarm by periodically reading the third predetermined code stored in the storage area of an alarm sending related mode of the corresponding mode. Preferably, the respective steps may be executed by a micro processing unit (MPU) capable of sequentially construction. Furthermore, in order to store this process as programmed steps, a read only memory (ROM) may be used, and to store the third predetermined code in response to the corresponding mode, a random access memory (RAM) used. The corresponding mode may including a time setting mode, an alarm setting mode, a morning call setting mode and the like. In accordance with the present invention, these objects are sufficiently obtained by dialing the unique number of a corresponding paging receiver by use of a telephone apparatus connected to a public line and then sequentially depressing the first, second and third predetermined codes.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF CERTAIN PREFERRED EMBODIMENTS

Figure 1:
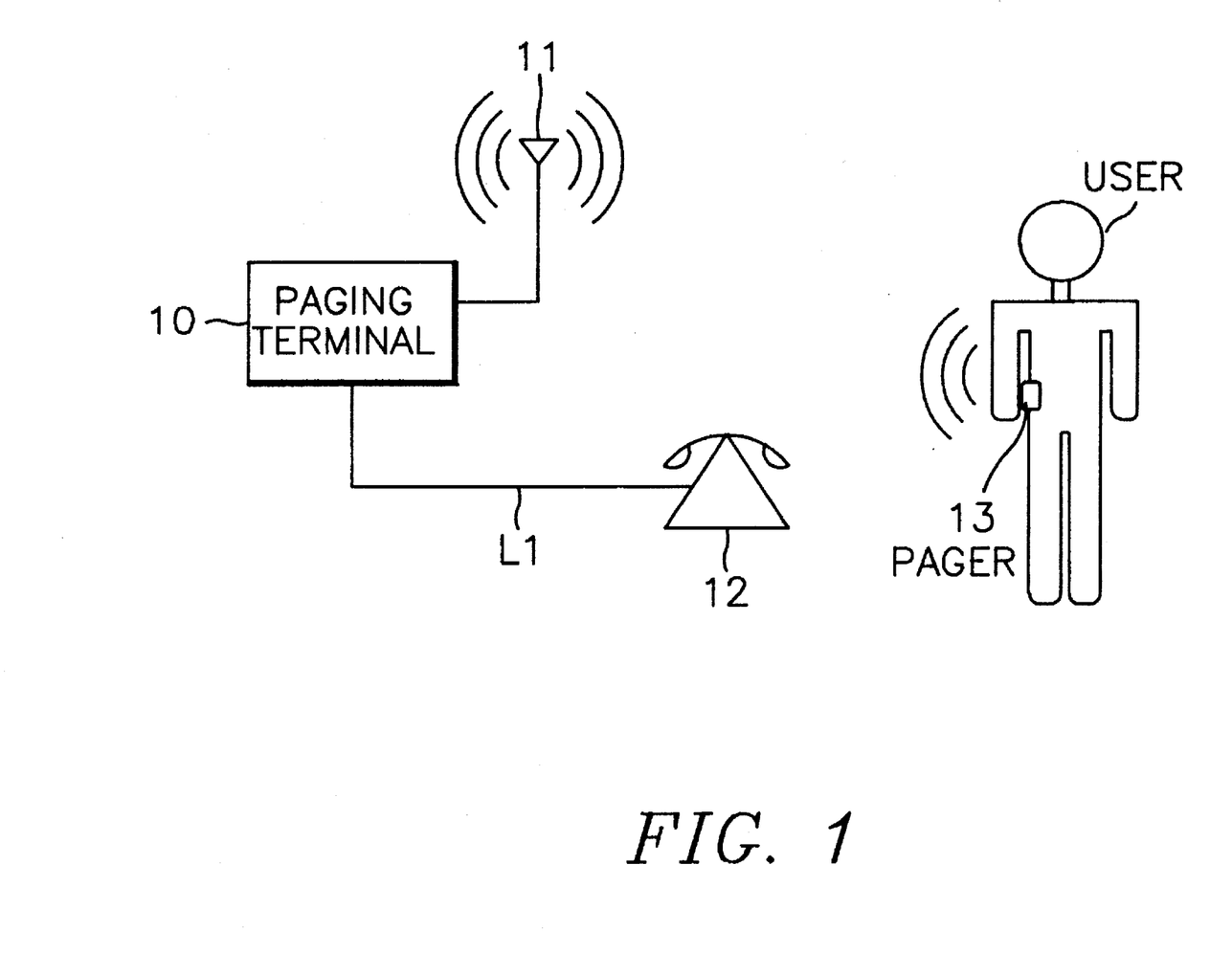
FIG. 1 is a block diagram of a radio paging system as incorporated into one embodiment of the present invention.

Referring now to the drawings and particularly to FIG. 1, the radio paging system includes a paging terminal 10 having at least a transmitter. The paging terminal 10 is connected to an antenna 11 and to a telephone apparatus 12 through a public line L1. A telephone switching system is usually coupled between the public line L1 and the telephone apparatus 12. A person desiring to call a user wearing a pager 13 can dial by use of telephone apparatus 12, an unique number assigned to pager 13. Paging terminal 10 processes the unique number received through a fixed wire telephone line L1 and sends a signal by radio waves through antenna 11. Therefore, when the unique number is received, pager 13 gives an alarm or displays messages. The POCSAG (Post Office Code Standardization Advisory Group) code is used as a radio signal sent through antenna 11. The POCSAG code is the exclusive signal form for paging receivers currently used in the world, and it is specified in CCIR Recommendation No. 584. The internal circuit block of pager 13 is conventional in the art.

Pager 13 has functions for detecting the reception of general calls, storing the calls in a memory and displaying it. Calls are stored in memory in received order and the user may confirm reception of sequentially stored calls. If there is a large number of received calls, the user should read all of the stored messages from the beginning up to the current time. Moreover, even if the same call is repeatedly received, the user must read the data repeatedly as the pager displays in chronological order or reception each message stored in the queue, and confirms the data from the start in order to see previously received calls. Furthermore, even if the caller transmits a call identifying a very urgent situation, the call is equally processed with general messages, and as a result, it is difficult to inform the user of the urgent situation.

Figure 2:
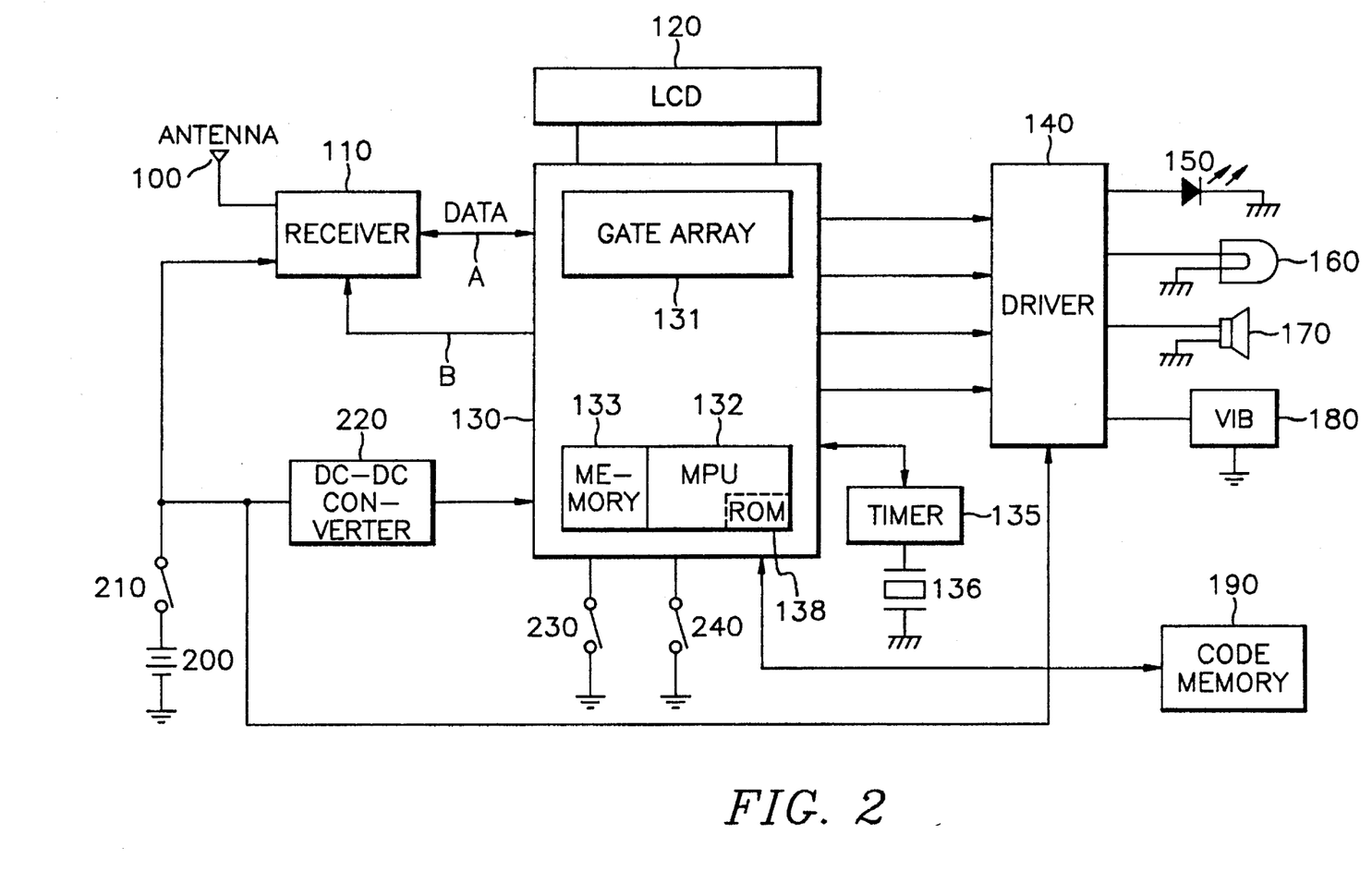
FIG. 2 is block diagram of a particular embodiment of a radio paging receiver constructed according to the principles of the present invention.

Referring now to FIG. 2, a modulated radio frequency signal (a RF signal) provided by paging terminal 10 shown in FIG. 1 is picked up by an antenna 100 connected to a receiver 110. Receiver 110 is periodically driven to thereby minimize power consumption. In order to periodically drive receiver 110, a decoder 130 provides a driving signal to receiver 110 through line B. When the driving signal is applied, receiver 110 demodulates the RF signal received from antenna 100 to generate logic level data through line A. Decoder 130 decodes the logic level data received through line A. In more detail, decoder 130 reads an identification (i.e., an "ID") address code stored in code memory 190 and checks whether or not the received calling data contains the unique address code of the pager and is therefore a call directed to the paging receiver (i.e. an "ID call") by comparing the ID address code with the logic level data. If the received calling data is identified as a call directed to the paging receiver (i.e. an "ID call"), decoder 130 decodes the successively received logic level data and stores the received messages in a memory 133. The stored messages are displayed on a liquid crystal display (LCD) 120. When the ID call is received, decoder 130 sends an alarm instruction to a driver 140. Driver 140 drives the alarm system including a speaker 170 for generating an alert tone, a vibrator 180 for providing a mechanical oscillation to the user, a call indicator 150 driven during the operating period of speaker 170, and a lamp 160 for back-lighting LCD 120. Decoder 130 is connected to external switches 230 and 240. Switch 230 is designated by the user so as to selectively drive either speaker 170 or vibrator 180. Switch 240 is a read key for forcing speaker 170 or vibrator 180 to stop, or for recalling received messages stored in memory 133. A DC-DC converter 220 produces power for use in decoder 130 by using a battery 200 which has a limited power capacity and is rechargeable. A switch 210 opens or closes the circuit with battery 200 to enable electrical power from battery 200 to be provided to the pager or, when switch 210 is opened, to interrupt supply of power to the pager.

Figure 3A:
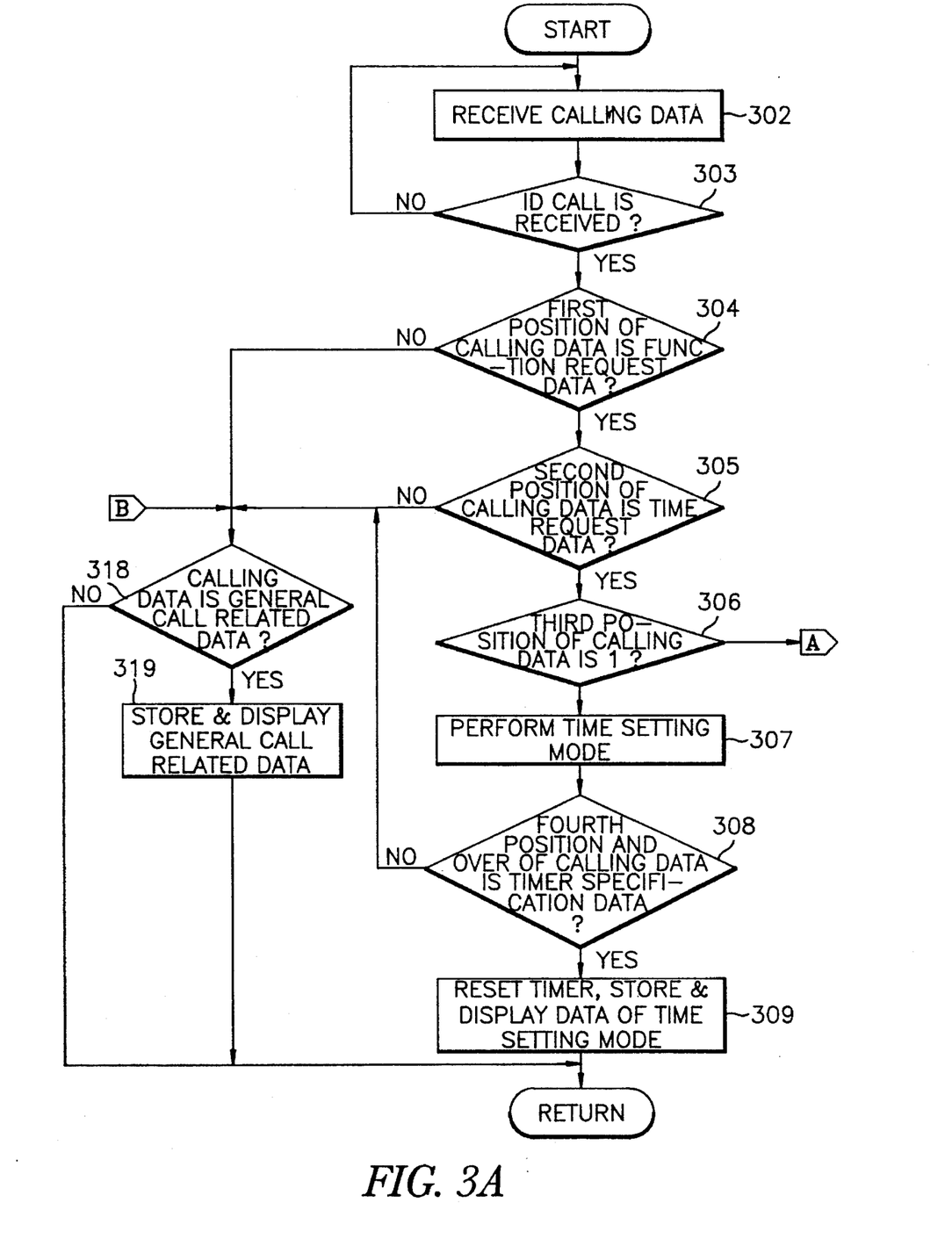
FIGS. 3A and 3B are flow charts showing a time registration procedure implemented according to the principles of present invention.
Figure 3B:
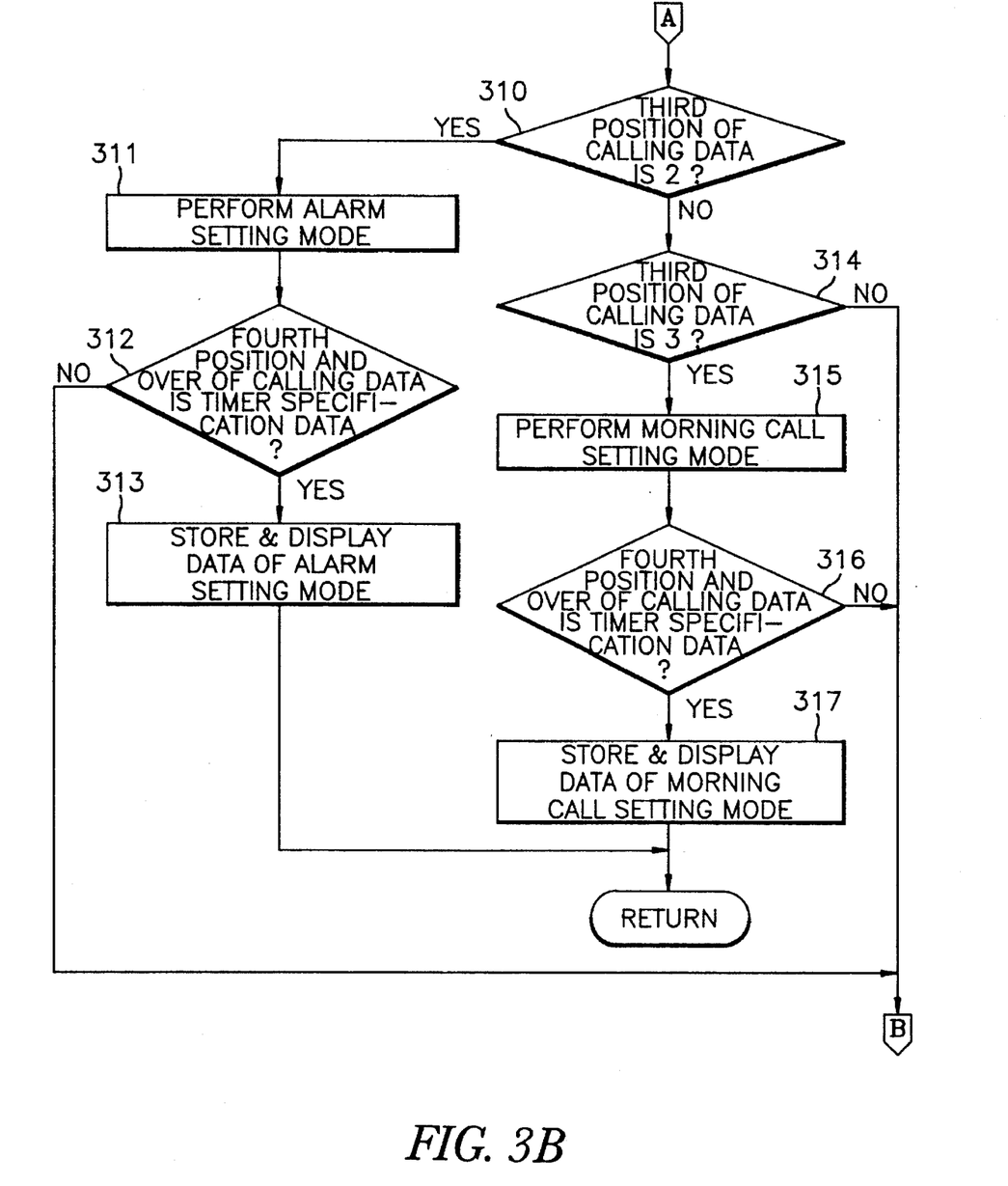
Figure 5A:
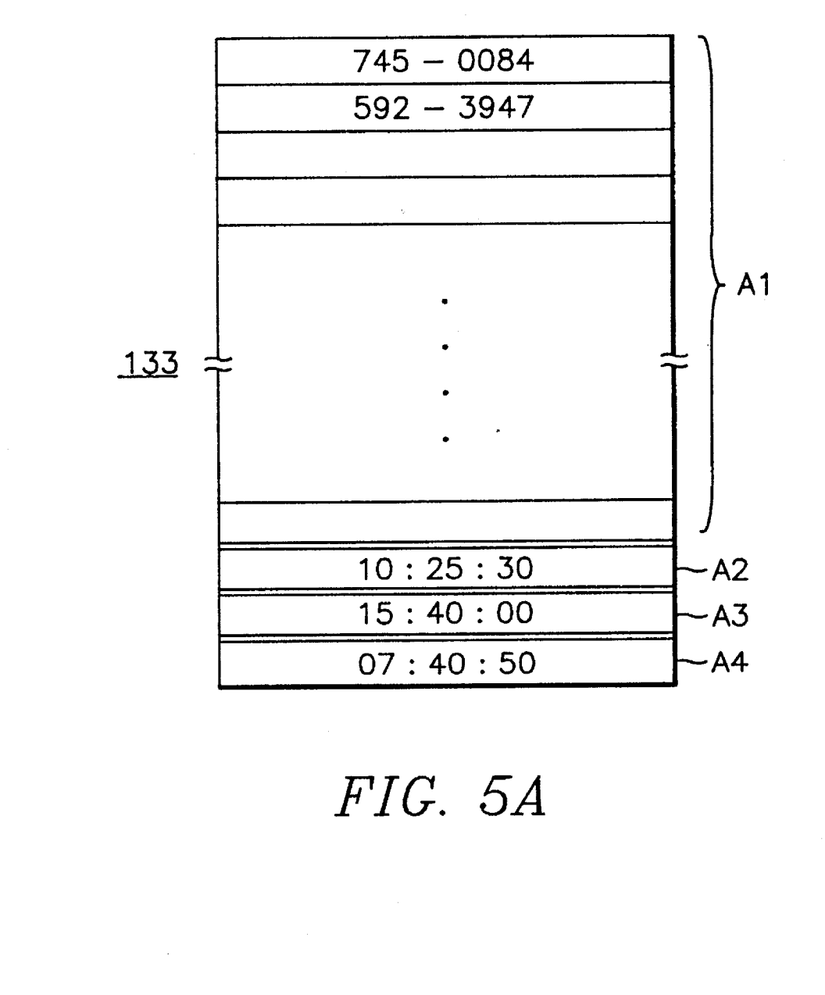
FIGS. 5A and 5B are diagrams illustrating the data storage state of a memory used in the embodiment of FIG. 2 according to the principles of the present invention.
Figure 5B:
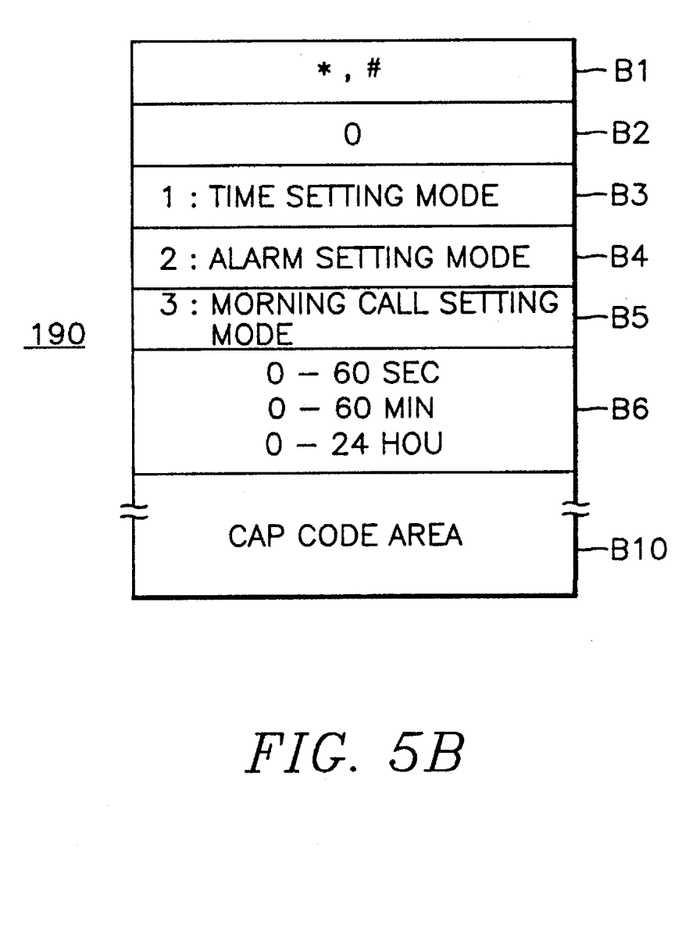

Decoder 130 has a gate array 131, a micro processing unit (MPU) 132 and memory 133. Gate array 131 uses a plurality of gate elements for decoding the logic level data received via line A together with MPU 132. MPU 132, possibly a four-bit, one chip processor containing a read only memory (i.e., a "ROM") 138, performs the whole operation necessary for the reception of the radio call with a program contained in ROM 138. A program (a control procedure shown in FIGS. 3A and 3B is programmed using a programming language) configured according to the present invention may be stored in the ROM. Memory 133 may be a random access memory (i.e., a "RAM") and may have a structure with an internal area arranged as shown in FIGS. 5A and 5B.

An example of time alarm operation of the radio paging receiver having the structure so far illustrated will now be described. Referring again to FIG. 1, in order to call pager 13, the caller uses keypad 15 to dial the number of the unique address code assigned to the pager to be called, and then dials first, second and third predetermined codes, successively, by use of keypad 15 a telephone apparatus 12 installed for example, in a household, an office or elsewhere. The first code uses function keys (for example, "*" and "#") and a dial key "0", and the second code uses keys "1", "2 and 3". It is assumed that the dial key "1" selects a time setting mode, that dial key "2" selects an alarm setting mode, and that dial key "Y" selects a morning call setting mode. The third code uses the ten keys "0" to "9" of keypad 15, to designate the time selected by the user. In order to check whether or not the first, second or third predetermined code is received, the radio paging receiver has storage areas within code memory 190-provided by an electrically erasable and programmable read only memory (i.e., an EEPROM) for instance, as is shown in FIG. 5B. That is, area B1 and B2 are for storing and confirming the reception of the first predetermined code after "code"; and confirming reception of the second code and determining a corresponding mode. An area B6 is for storing and confirming the reception of the third predetermined code, and an area B10 is for storing a CAP (Customer administration panel) code of the ID address code assigned to the particular radio pager. First, the user should accurately adjust the hour by resetting timer 135. Assuming that the hour is twenty five minutes and thirty seconds past ten, the user should dial the unique number of the pager and further depress "*", "0", "1", "1", "0", "2", "5", "3", "0". successively. The keys "*" and "0" correspond to the first predetermined code, and the key "1" is the second predetermined code indicating the time setting mode. The keys "1", "0", "2", "5", "3", "0" correspond to the third predetermined code.

The user may also set the appointed alarm time. For example, in the case of setting the appointed time of forty minutes and zero seconds after three P.M., the user should dial the unique number of the pager and "*", "0", "2", "1", "5", "4", "0", "0", "0". The key "2" is the second predetermined code representing the alarm setting mode. Similarly, the morning call is set by dialing the second predetermined code of "3". the telephone apparatus used by the user is an electronic telephone apparatus capable of generating a DTMF (Dual Tone Mul-Frequency) signal.

Figure 4:
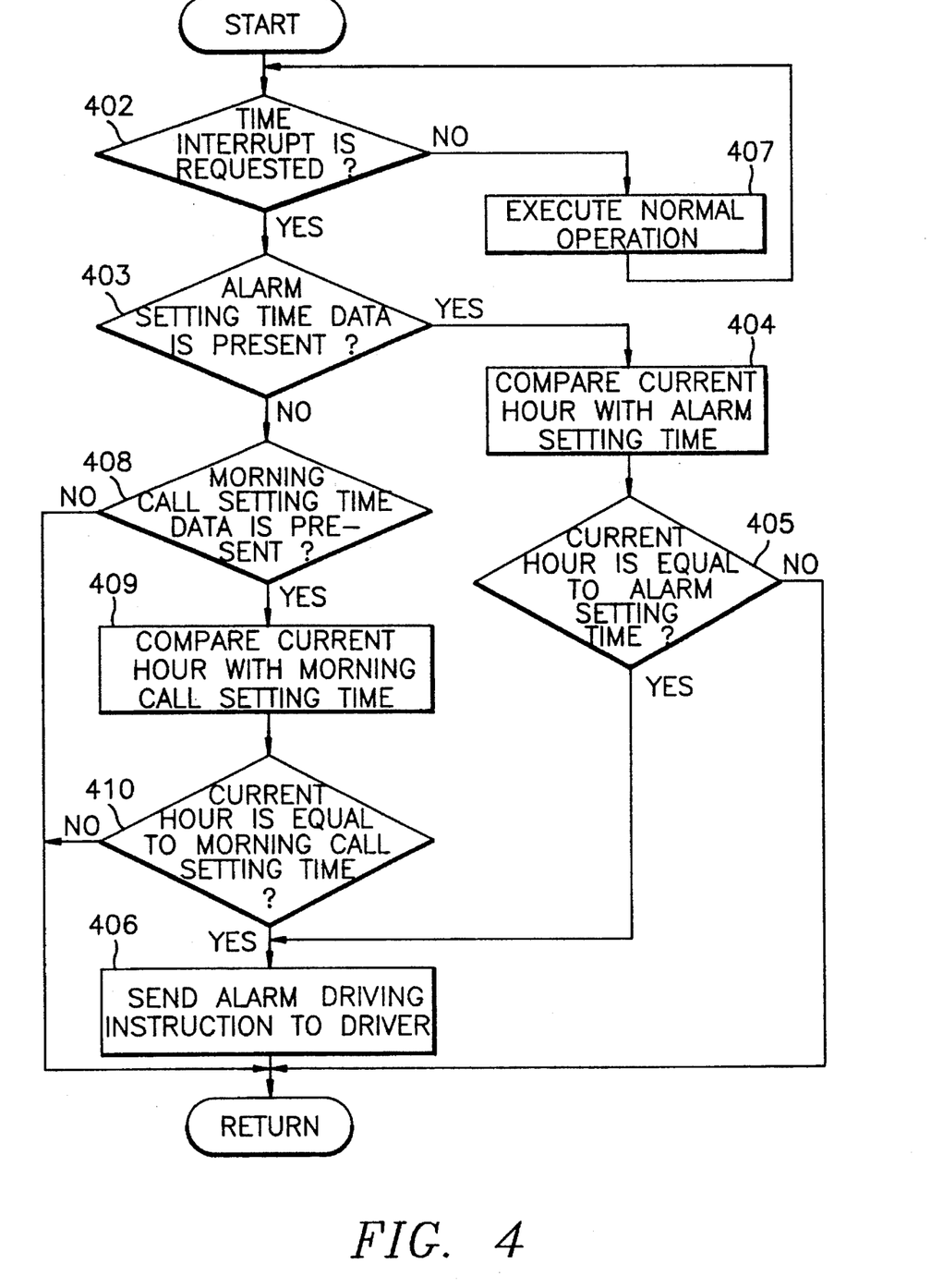
FIG. 4 is a flow chart illustrating a time alarm procedure implemented according to the principles of the present invention.

The call generated by the operation of the user is applied to the paging terminal 10 shown in FIG. 1. Paging terminal 10 encodes the call then formats to a predefined transmission form. Thereafter, the paging terminal 10 sends the call by radio through antenna 11. MPU 132 of the radio paging receiver implements the flow of control steps stored in ROM 138, sequentially, as shown in FIGS. 3A, 3B and 4.

Referring to FIG. 3A, at step 302, a preamble signal transmitted from the paging terminal 10 is checked by periodically turning on and off the receiver 110. At step 303, a check is made to see if an ID call is received. That is, if the preamble signal is received, a synchronizing signal is detected and then whether the ID call is received or not is checked. When the ID call is received, step 303 proceeds to step 304 to detect the first code by decoding the calling data dialed after the user depressed the unique number assigned to the receiver. If the first code is received as the calling data, the MPU 132 determines the calling data is time related.

At step 304, whether a first position of the calling data is function request data or not is checked. The function request data is determined by comparing the data corresponding to the first position of the calling data with the data of the corresponding area B1 shown in FIG. 5B. It should be noted that the keys "*" and "#" are adopted for purpose of explaining the purpose of the present invention and any keys may be used.

At step 305, whether a second position of the calling data is time request data or not is checked. The time request data is determined by comparing the data corresponding to the second position of the calling data with the data of the area B2. If the first position of the calling data is function request data and the second position thereof is the time request data, the calling data forming the first, second and third codes is time related data instead general message data. In preferred embodiment, the time related data, such as keys "*" and "0", are called the first predetermined code. If the second position of the calling data is determined to be the time request data, step 305 is succeeded by step 306. At, step 306, 310, and 314, a third position of the calling data is checked to see if it is "1", "2", or "3" in order to decide a corresponding mode of the time setting process requested by the caller. Similarly, the corresponding mode is determined by comparing the data corresponding to the third position of the calling data with the data stored in areas B3, B4 and B5. If the data of the third position, i.e. the second predetermined code, is "1", step 305 advances to step 307 to perform the time setting mode. If the second predetermined code is "2", step 310 advances to step 311 to execute the alarm setting mode, and if it is "3" step 314 proceeds to step 315 to implement the morning call setting mode. At steps 308, 312 and 316 subsequent to steps 307, 311 and 315, respectively, the MPU 132 checks the third predetermined code to see if it corresponds to timer specification. The timer specification is determined by comparing the data immediately following the third position of the calling data with the data of area B6 shown in FIG. 5B. If the third predetermined code corresponds to the timer specification, steps 308, 316 and 312 are followed by steps 309, 313 and 317, respectively. At step 309, timer 135 shown in FIG. 2 is reset and the data of the time setting mode is stored in an hour storage area of the memory 133. Moreover, the stored hour is displayed on LCD 120. At step 313, the data of the alarm setting mode is stored in an alarm time storage area of memory 133 and the stored alarm time is displayed on LDC 120. In the same manner, at step 317, data of the morning call setting mode is stored in a morning call time storage area of memory 133 and the stored morning call time is displayed on LDC 120. Therefore, in areas A2, A3 and A4 of the memory 133 as shown in FIG. 5A, the time designated by the user is stored and the stored data can be confirmed by display on LCD 120. The alarm time and the morning call time are respectively stored in the areas A3 and A4.

Area A2 stores the current time. For example, after one minute elapses MPU 132 receives a time data pulse from timer 135 to update the data in A2 by a minute. If general call related data rather than is received, this data is stored in an area A1.

The control procedure shown in FIGS. 3A, 3B and 4 may be adequately programmed in the ROM with C programming language. The compiler of a C language program produces a compact program and it is easy to correct. Any other language implemented according to the principle of this invention however, may be applicable to the control procedure.

Now, how the alarm of the registered time is sent to the user is described with references to FIG. 4.

At step 402, whether time interrupt is requested or not it is checked. The time interrupt may be executed by the program of MPU 132 or at the request timer 135. In this case, it is desirable to have the period of time interrupt be one minute. If the minute interrupt is requested, step 402 advances to step 403 to check whether or not alarm setting time data is present in area A.3 shown in FIG. 5A. If alarm setting time data is not present in area A3, step 403 proceeds to step 408 to see if morning call setting time data is present in area A4. If the alarm setting time data is present in the area A3, step 403 is followed by step 404 to compare the current time read from timer 135 with stored alarm setting time data. If the morning call setting time data is present in area A4, step 408 advances to step 409 to compare the current time with stored morning call setting time data. In this case, if data stored in A2 shown in FIG. 5A has been updated, the data of area A2 may be compared with the stored time data without reading the current hour from timer 135. At 405, a check is made to see if the current time is equal to the alarm setting time. At step 409, whether the current time corresponds to the morning call setting time is checked. If the current hour is equal to the alarm setting time or morning call setting time, then MPU 132 sends, at step 406, an alarm driving instruction to driver 140. Then driver 140 sends an alarm in response to the instruction.

As may be apparent from the aforementioned description, since additional key related to the time function are not required, a compact radio paging receiver can be obtained. Moreover, embodiments may be constructed without the need for a plethora of switches mounted externally to the housing of a radio receiving pager because the circuit and process disclosed may be practiced by, in response to receipt of a time related message (as distinguished from a general message call) either automatically re-setting the current time maintained by the pager, or automatically setting an alarm to be issued by the pager when the time represented by the third code becomes the current time, or by automatically setting the pager to issue a morning wake-up call at the time represented by the third code, depending upon the mode represented by the second code. This advantageously eliminates the necessity for the person wearing the paging receiver to respond to an incoming message by manually adjusting or programming the pager in accordance with the content to the message. Furthermore, since the time function is provided without requiring either the use or modification of a peripheral circuit, the burden of the manufacturing cost is lessened.

While preferred embodiments of the invention have been particularly shown and described, it will be understood by those skilled in the art that foregoing and other changes in form and details may be made without departing from the spirit and scope of the invention as defined in the appended claims and that it may be possible, for example, to define the first and second predetermined codes, by use of any other keys. Furthermore, the principles of the present invention are also directly applicable to mobile radio communication systems, cellular telephones and to other types of broadcast receivers.

What is claimed is:

1. A process for processing calling data provided in a communication system comprising a paging terminal, comprising the steps of:

receiving in a radio receiver the calling data via radio signal from said paging terminal;

determining within said radio receiver whether a first component of the calling data is time related data by decoding said calling data;

when said first component is time related data, detecting a corresponding mode by comparing a second component of the calling data received subsequent to said first component with predefined mode data;

storing within said radio receiver a third component of the calling data indicative of a time, said third component being received subsequent to said second component, in a storage area corresponding to the mode detected; and providing an alarm driving instruction when a current time corresponds to said time indicated by said third component stored in a storage area corresponding to an alarm setting mode.

2. The process as claimed in claim 1, further comprised of said first, second and third components comprising data corresponding to tone signals generated by keys on a telephone.

3. The process as claimed in claim 1, further comprised of said step of detecting the corresponding mode comprises detecting one of a time setting mode, an alarm setting mode and a morning call setting mode in response to the contents of said second component.

4. The process as claimed in claim 1, further comprised of:

maintaining a current time within said radio receiver; and re-setting said current time to a time represented by said third component in dependence upon said corresponding mode.

5. The process of claim 1, further comprised of:

maintaining a current time within said radio receiver; and performing said step of detecting a corresponding mode by:

determining whether said second component indicates a mode for setting of said current time to a time represented by said third component; and determining whether said second component indicates a mode for setting of a timed alarm to be issued by said radio receiver when said current time equals said time represented by said third component.

6. The process of claim 1, further comprised of:
maintaining a current time within said radio receiver; and performing said step of detecting a corresponding mode by:
determining whether said second component indicates a mode for setting of said current time to a time represented by said third component;
determining whether said second component indicates a mode for setting of a timed alarm to be issued by said radio receiver when said current time equals said time represented by said third component; and
determining whether said second component indicates a mode for setting of a morning call to be issued by said radio receiver when said current time equals said time represented by said third component.

7. A process for setting a time alarm in a radio paging receiver, comprising the steps of:
determining whether a first code component of calling data received by the radio paging receiver via a radio signal is time related data by decoding the calling data carried by the radio signal;
when said first code component is time related data, detecting a corresponding mode by comparing predefined mode data with a second code component of said calling data received subsequent to said first code component;
storing a third code component of said calling data received subsequent to said second code component in a storage area of a memory assigned to said corresponding mode detected; and
providing an alarm driving instruction when a time represented by said third code component stored in said storage area is equal to a current time by periodically reading said third predetermined code stored in the storage area.

8. The process as claimed in claim 7, further comprised of said first, second and third code components comprising data corresponding to tone signals generated by keys on a telephone.

9. The process as claimed in claim 7, further comprised of said step of detecting the corresponding mode comprises detecting one of a time setting mode, an alarm setting mode and a morning call setting mode in response to the contents of said second predetermined code.

10. The process as claimed in claim 7, further comprised of said step of detecting the corresponding mode comprises:
determining whether said second code component indicates a mode for setting of a current time counted by the radio paging receiver;
determining whether said second code component indicates a mode for setting of a timed alarm by the radio paging receiver; and
determining whether said second code component indicates a mode for setting a morning wake-up call by the radio paging receiver.

11. The process of claim 7, further comprised of:
maintaining said current time within the radio paging receiver; and performing said step of detecting a corresponding mode by:
determining whether said second code component indicates a mode for setting of said current time to said time represented by said third code component; and
determining whether said second code component indicates a mode for setting of a timed alarm to be issued by the radio paging receiver when said current time equals said time represented by said third component.

12. A radio paging receiver for processing calling data provided in a communication system comprising a paging terminal, said paging receiver comprising:
means for receiving the calling data from said paging terminal via radio signals;
control means connected to said receiving means, comprising:
means for checking if a first code component is time related data by decoding said calling data,
means for detecting a corresponding mode by comparing a second code component of said calling data received subsequent to said first code component with mode data when said first code is the time related data,
storage means for storing a third code component of said calling data received subsequent to said second code component in a storage area assigned to said corresponding mode, and
means for providing an alarm driving instruction when an alarm time represented by said third code component equals a current time by periodically reading said third predetermined code stored in the storage area;
memory means connected to said control means, for storing said third code component, said memory means comprising the storage area assigned to said third code component in response to said corresponding mode; and
means connected to said control means, for driving an alarm in response to said alarm driving instruction.

13. The radio pager receiver of claim 12, further comprised of means for maintaining said current time.

14. The radio pager receiver of claim 12, further comprised of said control means detecting said corresponding mode by:
determining whether said second code component indicates a mode for setting of said current time; and
determining whether said second code component indicates a mode for setting of a timed alarm to be issued by the radio paging receiver.

15. The radio pager receiver of claim 12, further comprised of said control means detecting said corresponding mode by:
determining whether said second code component indicates a mode for resetting said current time to said time represented by said third code component; and
determining whether said second code component indicates a mode for storing as said alarm time said time represented by said third code component.

16. The radio pager receiver of claim 12, further comprised of said control means:
automatically setting said current time to said time represented by said third code component when said second code component indicates a mode for setting said current time; and
automatically storing as said alarm time said time represented by said third code component when said second code component indicates a mode for setting a timed alarm.

17. A radio paging receiver for processing calling data provided in a communication system comprising a paging terminal, said paging receiver comprising:
means for receiving the calling data from said paging terminal via radio signals;
control means connected to said receiving means, comprising: means for determining whether a first code component is time related data by decoding said calling data, means for detecting a corresponding mode by comparing a second code component of said calling data received subsequent to said first code component with mode data when said first code is the time related data, means for causing a third code component of said calling data received subsequent to said second code component to be stored in a storage area assigned to said corresponding mode, and means for providing an alarm driving instruction when an alarm time represented by said stored third code component equals a current time; means connected to said control means, for driving an alarm in response to said alarm driving instruction.

18. A method of updating time data in a radio receiver, comprising:

entering on a telephone keypad a radio receiver identification code, a function code comprising a first component signifying time-related data and a second component indicating a mode selected by a user, and a time code indicating a time selected by a user;

transmitting said entered identification code, function code, and time code over a telephone line to a paging terminal;

retransmitting from the paging terminal to a radio receiver said identification code, function code, and time code in the form of radio waves;

receiving said identification code, function code, and time code in a radio receiver having stored therein a unique stored identification code and predefined mode data corresponding to an alarm setting function and a current time setting function;

when a received said identification code matches said unique stored identification code and said first component of a received said function code signifies time-related data, determining whether said second component of a received said function code matches one of said stored predefined mode data;

when said second component of a received said function code is determined to match predefined mode data corresponding to an alarm setting function, storing a received said time code in said radio receiver as an alarm time;

generating an alarm in said radio receiver when a current time corresponds to said alarm time;

when said second component of a received said function code is determined to match predefined mode data corresponding to a time setting function, storing a received said time code in said radio receiver as current time; and periodically updating said current time stored in said radio receiver.

* * * * *

UNITED STATES PATENT AND TRADEMARK OFFICE
CERTIFICATE OF CORRECTION

PATENT NO. : 5,475,380
DATED : December 12, 1995
INVENTOR(S) : Jong-Yoon Shim

It is certified that error appears in the above-indentified patent and that said Letters Patent is hereby corrected as shown below:

Column 5, line 50, insert "after "code"; with  --, areas B3,B4, and B5 are for storing --:

Signed and Sealed this

Nineteenth Day of August, 1997

Attest:

BRUCE LEHMAN

Attesting Officer     *Commissioner of Patents and Trademarks*